May 8, 1934.  O. RALEY  1,958,348
AUTOMATIC PROJECTING MEANS FOR OVEN TRAYS
Filed July 15, 1932   5 Sheets-Sheet 1
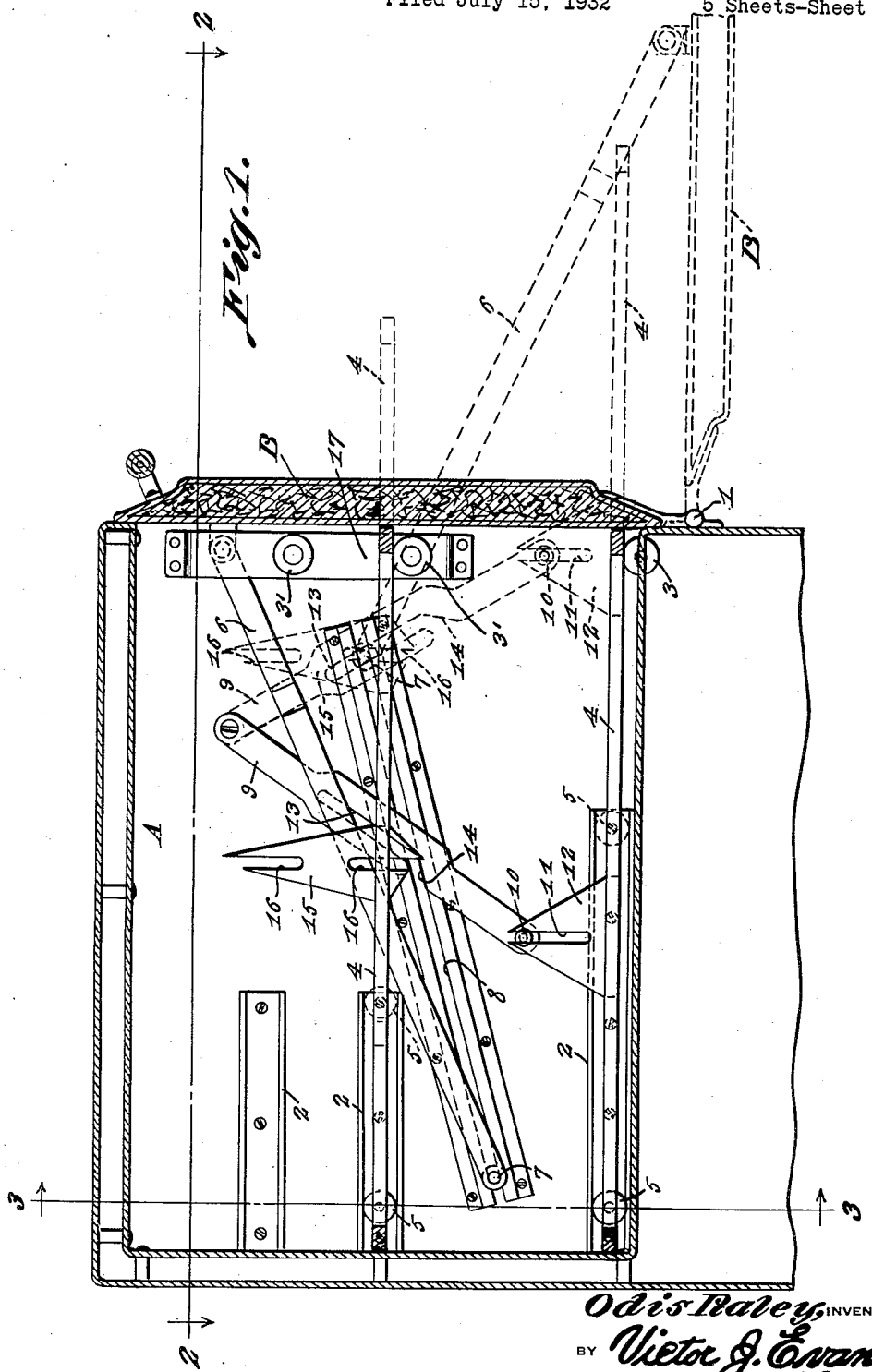
Odis Raley, INVENTOR
BY Victor J. Evans and Co.
ATTORNEY May 8, 1934. O. RALEY 1,958,348
AUTOMATIC PROJECTING MEANS FOR OVEN TRAYS
Filed July 15, 1932 5 Sheets-Sheet 2
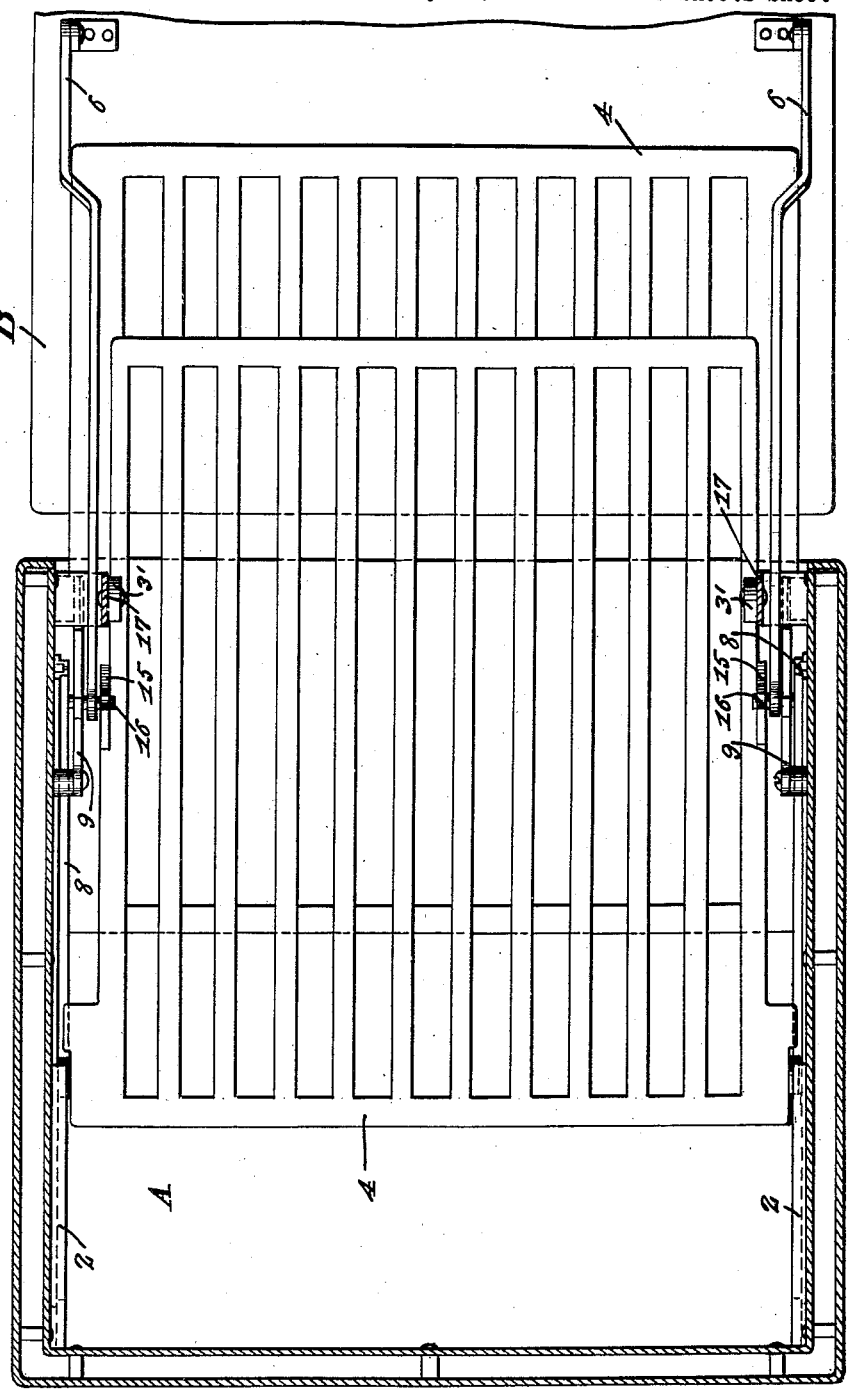

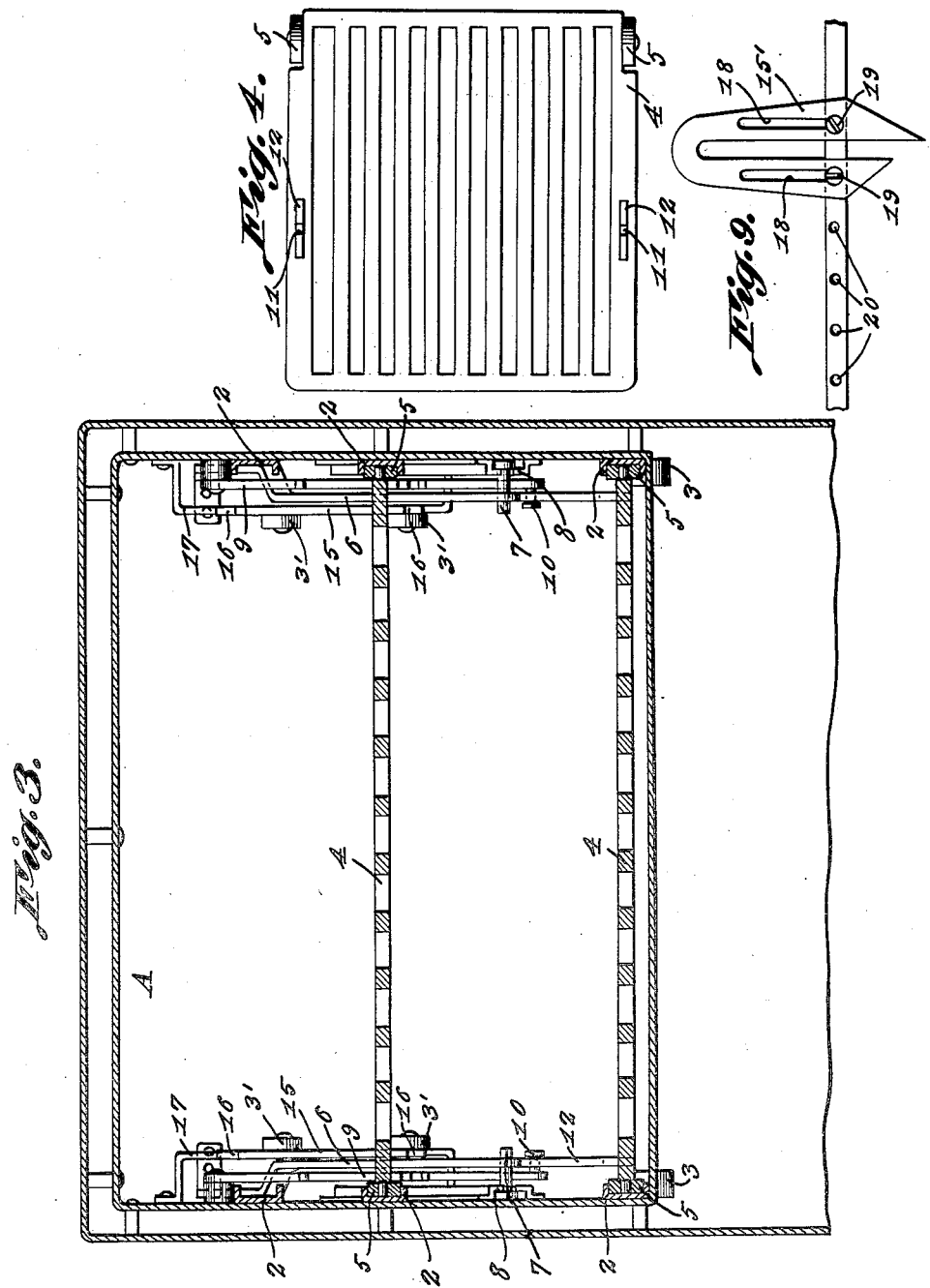

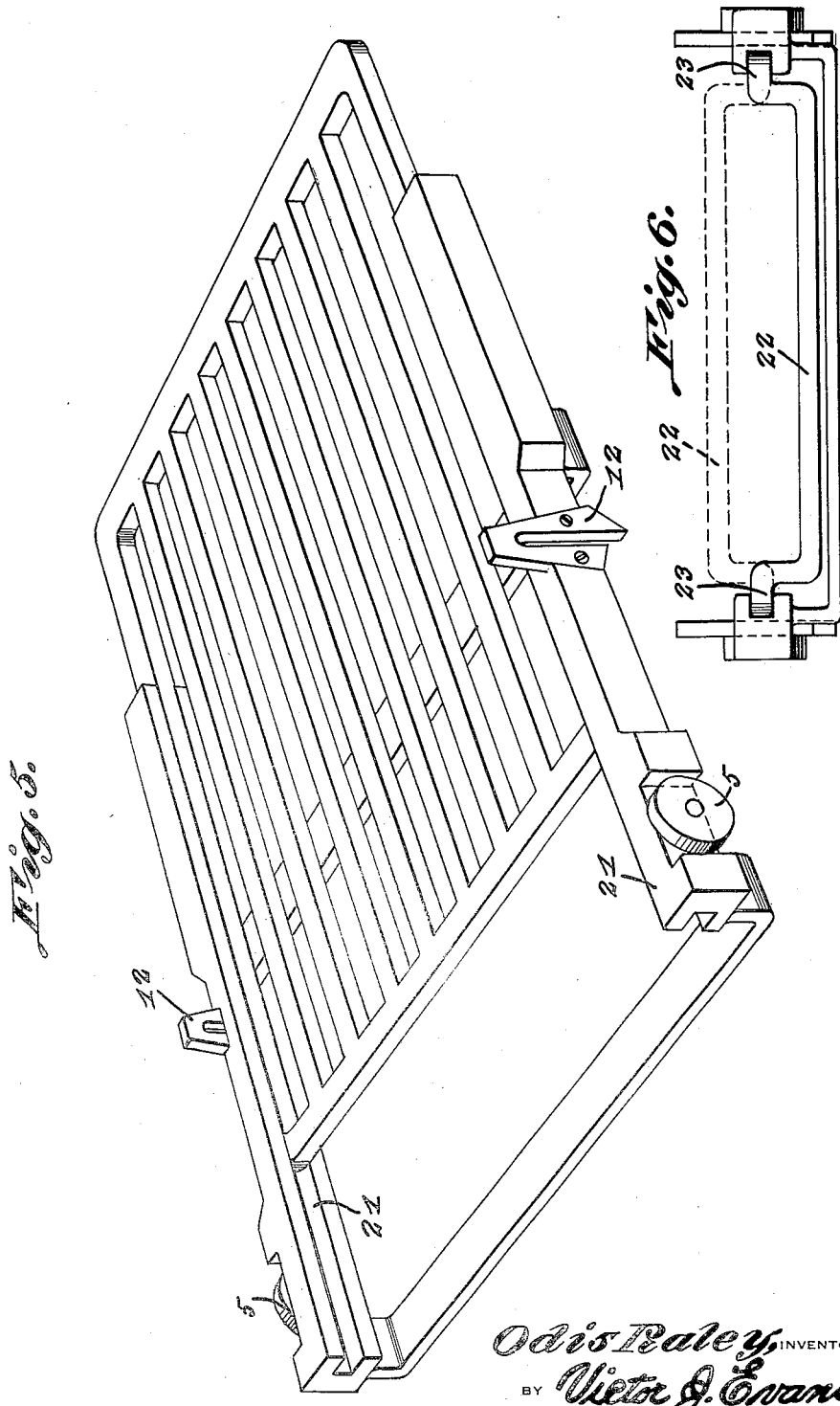

May 8, 1934. O. RALEY 1,958,348
AUTOMATIC PROJECTING MEANS FOR OVEN TRAYS
Filed July 15, 1932 5 Sheets-Sheet 5
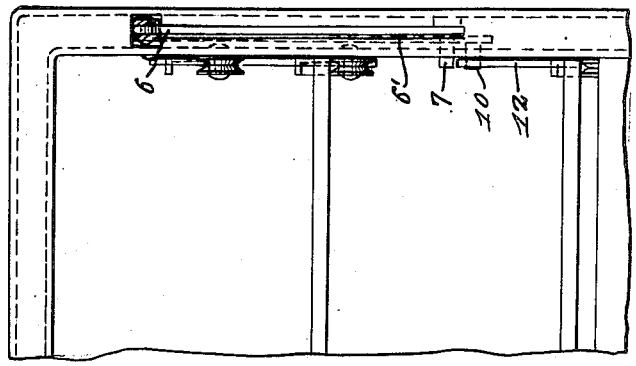
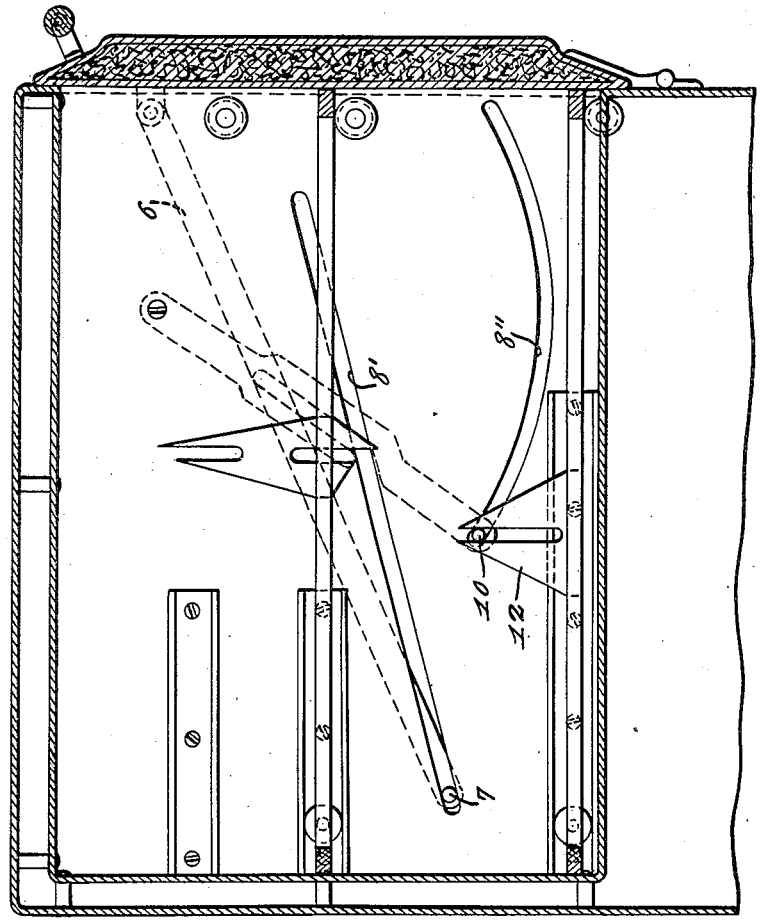
Odis Raley, INVENTOR
BY Victor J. Evans and Co.
ATTORNEY Patented May 8, 1934

1,958,348

UNITED STATES PATENT OFFICE 1,958,348

AUTOMATIC PROJECTING MEANS FOR OVEN TRAYS

Odis Raley, Paragould, Ark.

Application July 15, 1932, Serial No. 622,735

6 Claims. (Cl. 126—340)

This invention relates to improvements in cooking ovens, the general object of the invention being to provide means for automatically projecting a tray or trays when the oven door is moved to open position, thus facilitating the placing of articles in the oven and their removal therefrom.

A further object of the invention is to so form the parts that the trays will not be moved when the door is but partly opened so that the articles being cooked in the oven can be inspected without moving them from the oven, but when the door is fully opened, the trays will be projected so that the articles can be readily removed from or placed in the oven.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a vertical sectional view through the improved oven.

Figure 2 is a section on line 2—2 of Figure 1.

Figure 3 is a section on line 3—3 of Figure 1.

Figure 4 is a view of the tray.

Figure 5 is a view of a tray slidably arranged in a frame which is adapted to be moved by the means operated by the door.

Figure 6 is an end view of Figure 5, but showing a different form of tray.

Figure 7 is a view similar to Figure 1, but showing a modification.

Figure 8 is a view looking into the oven shown in Figure 7.

Figure 9 is a detail view showing a further modification.

In these drawings, the letter A indicates the oven and B the door thereof which is hinged at its lower end, as shown at 1. Track members 2 are placed on the side walls of the oven at the rear end thereof, each track member being formed of channel iron and rollers 3 and 3' are located at the front end of the oven, these track members and rollers being adapted to slidably support the trays 4, each of which is provided with a pair of rollers 5 at its rear end for engaging the track members. A pair of bars 6 is pivoted to the door, one at each side thereof, and the inner end of each bar carries a headed pin 7, the head of which operates in the diagonally arranged guideway 8 fastened to the inner side wall of the oven. The inner ends of these guideways are closer to the bottom of the oven than are their outer ends and as will be seen, when the door is moved to open position, the rods 6 will move outwardly with the door, thus causing the pins 7 to move up the guideways. A lever 9 is pivoted at its upper end to each side wall of the oven and the lower end of each lever carries a pin 10 which engages a vertical slot 11 in an upright member 12 fastened to the lower tray. Each lever has an enlarged intermediate portion which is formed with a longitudinal slot 13 which opens out at its lower end through the rear edge of the lever, with the bottom wall of this part of the slot extending downwardly and rearwardly, as shown at 14. When the door is closed and the tray is in its rearward position, this wall 14 of the slot of each lever 9 is in alignment with the upper edge of the lower member of the guideway 8 so that the pin 7 will enter the lower end of the slot as the bar 6 moves forwardly and thus said pin will strike the front edge of the slot 13 and cause the lever to swing forwardly upon the continued movement of the bar 6. Thus the lower end of the lever is swung forwardly and its pin 10, engaging the wall of the slot 11 in the member 12, will move the lower tray forwardly, as shown in dotted lines in Figure 1. As will be seen, the pins 7 must move a considerable distance up the guideways 8 before the pins enter the slots of the levers 9 so that the lower tray will not be moved until the door has been opened to a considerable extent. Thus the tray will not be projected until the door is fully opened and the door can be partly opened without moving the tray. When the door is moved to closed position, the pins 7 will engage the rear walls of the slots 13 and thus swing the levers 9 rearwardly so as to move the lower tray back to its normal position and then the pins 7 will pass from the lower ends of the slots and continue down the guideways until the door is fully closed. The rollers 5 are of such a size that they will have a varied clearance on the upper flanges of the track members 2, so that when the tray is projected and the load tends to tilt the tray, the upper parts of the rollers will engage the upper flanges of the track members, thus preventing further tilting movement of the tray and eliminating the danger of the rollers binding in the track members.

In order to project an intermediate tray by the opening of the door, I attach to the side edges of this intermediate tray a member 15 which has a vertical slot 16 in each end thereof, with the front wall of each slot projecting beyond the rear wall thereof and these members are so placed that as the pins 7 enter the lower ends of the slots 13 in the levers 9, they will also engage the projecting front walls of the slots 16 in the members 15 so that the pins will move forwardly said members 15 and the tray to which they are attached, so that said intermediate tray is projected, but not to as great an extent as the lower tray, as shown in dotted lines in Figure 1. As the parts move forwardly, the pins 7 will move up the lower slot 16 in the members 15 as the pins pass up the diagonally arranged guideways 8. If it is desired to place the intermediate tray in the top track members, this may be done by inverting the tray and placing it in said top track members so that the pins 7 will engage the slots 16 at the other ends of the members 15, as these members are made long enough to cause this engagement of the pins 7 with the said members 15 when the tray is inverted and placed in the upper track members. The intermediate tray will engage the rollers 3' both when in its intermediate position and in its top position. These rollers 3' are carried by channel shaped brackets 17 which are fastened to the sides of the oven at the front thereof and the bars 6 operate through these brackets, as shown in Figures 2 and 3.

As will be seen, the oven can be used with but the lower tray by removing the second tray or it may be used with the second tray in either an intermediate or in a top position.

Instead of using the members 15, which require the second tray to be inverted when placed in the top track members, I may use the adjustable members 15', one of which is shown in Figure 9. This member is formed with the slots 18 through which the screws 19 pass which connect the member with the tray. Thus by loosening the screws, the member can be adjusted from the position it occupies in Figure 9 to a position where it will depend a greater extent from the tray so that the tray can be used in the top track members. When in the position shown in Figure 9, the member 15' enables the tray to be placed in the intermediate track members. Each member 15' is adjustable on the tray, as said tray is formed with a plurality of pairs of holes 20, any pair of which is adapted to receive the screws 19, so that the members can be adjusted toward and away from the center of the tray, thus enabling the extent of projection of the tray when the door is opened to be adjusted. Of course, the members 15 can be made adjustable in the same manner, if desired.

In stoves other than those using coal or wood as fuel, the door operating rods 6 and the levers 9 may be placed in the walls of the oven, as shown in Figures 7 and 8, with slots 8' cut in the inner portions of the walls to form the guideways for the pins 7 of the levers 6 and other slots 8'' cut in said portions through which the pins 10 pass so that these pins can properly engage the slots in the members 12. In this case, of course, the brackets 17 for supporting the upper rollers 3' are not necessary. The rods 6 would operate through slots 6' cut in the side edges of the front of the oven, as shown in Figure 8.

Figures 5 and 6 show the tray slidably arranged in a frame 21, this frame carrying the members 12 and the rollers 5 so that said frame is moved by the movement of the door and by having the tray arranged in the frame, the tray can be pushed back into the oven when the frame is projected, so that it is not necessary to close the door in order to push the tray and the article carried thereby back into the oven. Of course, when the door is closed, the rear end of the tray will engage the rear wall of the oven and thus be returned to its normal position in the frame.

The tray may be formed as shown in Figure 6, which shows the major portion 22 of the tray as offset from its edge portions 23, these edge portions engaging the guideways in the frame so that the tray can be arranged as shown in full lines in Figure 6, or in dotted lines as shown in Figure 6. This arrangement permits the major portion of the tray with the article thereon to be either placed close to the bottom of the oven or be spaced therefrom.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with an oven including its door, a rod having its front end connected with the upper part of the door, a diagonally arranged guideway at one side of the oven, a projection on the lower end of the rod engaging the guideway, a lever pivoted at its upper end to a side of the oven, means for movably connecting the lower end of the lever to a tray and a slot in the lever having its lower end opening out through the rear edge of the lever whereby the projection on the rod will enter the slot during the final opening movement of the door to cause the lever to project the tray.

2. In combination with an oven including its door, a rod having its front end connected with the upper part of the door, a diagonally arranged guideway at one side of the oven, a projection on the lower end of the rod engaging the guideway, a lever pivoted at its upper end to a side of the oven, means for movably connecting the lower end of the lever to a tray and a slot in the lever having its lower end opening out through the rear edge of the lever whereby the projection on the rod will enter the slot during the final opening movement of the door to cause the lever to project the tray, a second tray in the oven, a slotted member connected therewith and having a portion of one wall of the slot arranged in the path of the projection whereby said second tray may be projected during the opening movement of the door.

3. In combination with an oven and its door, a number of trays in the oven, a pair of rods pivotally connected with the inner face of the door, diagonally arranged guideways at the sides of the oven, projections on the lower ends of the rods engaging the guideways, a pair of levers pivoted at their upper ends to the sides of the oven, upright members on the lower tray having vertical slots therein, projections on the lower ends of the levers engaging the slots, a longitudinally arranged slot in each lever adjacent the center thereof and having its lower end opening out through the rear edge of the lever whereby the projections on the rods will enter the longitudinal slots during the opening movement of the door to cause the levers to project the lower tray, slotted members on the upper tray having the front walls of the slots projecting beyond the rear walls whereby the projections on the rods will enter the slots and project the upper tray during the opening movement of the door.

4. In combination with an oven and its door, a number of trays in the oven, a pair of rods pivotally connected with the inner face of the door, diagonally arranged guideways at the sides of the oven, projections on the lower ends of the rods engaging the guideways, a pair of levers pivoted at their upper ends to the sides of the oven, upright members on the lower tray having vertical slots therein, projections on the lower ends of the levers engaging the slots, a longitudinally arranged slot in each lever adjacent the center thereof and having its lower end opening out through the rear edge of the lever whereby the projections on the rods will enter the longitudinal slots during the opening movement of the door to cause the levers to project the lower tray, slotted members on the upper tray having the front walls of the slots projecting beyond the rear walls whereby the projections on the rods will enter the slots and project the upper tray during the opening movement of the door, track members at the sides of the oven, rollers on the trays engaging the track members and rollers at the front end of the oven engaged by the trays.

5. In combination with an oven including its door, a tray slidably arranged in the oven, a vertically arranged slotted member adjustably connected with the tray and having the front wall of its slot projecting beyond the lower wall thereof, a rod having its front end pivoted to the door and a projection on its lower end, a guideway in which the projection moves, said projection engaging the projecting front wall of the slot when the rod is moved forwardly by the opening movement of the door so that the projection rides up in the slot and moves the tray forwardly.

6. In combination with an oven including a door, a rod pivotally connected to the upper part of the door, a tray slidable in the oven, a lever pivoted to the oven and pivotally and slidably connected to the tray, said lever having a slot opening outwardly through one edge of said lever to be engaged by the rod for imparting movement to the tray by the movement of the door, and guide means for the lever to direct the latter into the slot.

ODIS RALEY.